US007917677B2

(12) United States Patent
Johnson et al.

(10) Patent No.: US 7,917,677 B2
(45) Date of Patent: Mar. 29, 2011

(54) SMART PROFILER

(75) Inventors: Maynard Johnson, Oronoco, MN (US); Peter Wai Yee Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 12/210,263

(22) Filed: Sep. 15, 2008

(65) Prior Publication Data
US 2010/0070669 A1 Mar. 18, 2010

(51) Int. Cl.
*G06F 13/24* (2006.01)
*G06F 9/45* (2006.01)
(52) U.S. Cl. .................. 710/260; 717/154; 717/158
(58) Field of Classification Search .................. 710/260, 710/262, 264, 266–267; 700/28, 32–34; 713/100; 717/127, 130, 151, 154, 158
See application file for complete search history.

(56) References Cited

U.S. PATENT DOCUMENTS

| 5,768,500 | A | 6/1998 | Agrawal et al. |
| 6,718,539 | B1 | 4/2004 | Cohen et al. |
| 2005/0071612 | A1 | 3/2005 | DeWitt, Jr. et al. |
| 2005/0155018 | A1 | 7/2005 | DeWitt et al. |
| 2005/0155019 | A1 | 7/2005 | Levine et al. |
| 2006/0059486 | A1 | 3/2006 | Loh et al. |
| 2007/0234298 | A1 | 10/2007 | Hirai et al. |
| 2009/0157359 | A1* | 6/2009 | Chernoff ........................ 702/186 |
| 2009/0319758 | A1* | 12/2009 | Kimura ........................ 712/220 |
| 2010/0030939 | A1* | 2/2010 | Litovtchenko et al. ....... 710/263 |

OTHER PUBLICATIONS

"OProfile Manual". Chapter 3 'Usage'. Section 5 'Configuration details'. Online Jan. 24, 2003. Retrieved from Internet Aug. 3, 2010. <http://web.archive.org/web/20030124203756/http://oprofile.sourceforge.net/doc/detailed-parameters.html>.*
"Analyzing Program Performance with Sun WorkShop". CHapter 3 'Sampling Collector Reference'. Sun Microsystems, Inc. 2000. Retrieved from Internet Aug. 5, 2010. <http://www.camden.rutgers.edu/HELP/Documentations/Sun-compiler-docs/WS6/manuals/workshop/analyzing/Collector.html>.*

* cited by examiner

*Primary Examiner* — Thomas J Cleary
(74) *Attorney, Agent, or Firm* — Garg Law Firm, PLLC; Rakesh Garg; Libby Z. Toub

(57) ABSTRACT

A method, system, and computer usable program product for a smart profiler are provided in the illustrative embodiments. An allowable number of interrupts for use by a profiler application is determined. A count number for a counter is determined. The counter is configured to count occurrences of an event in a data processing system up to the count number. An interrupt is raised when the counter has counted the occurrences of the event up to the count number. The interrupt is processed. The counting of occurrences of the event, raising the interrupt, and processing the interrupt are repeated for a predetermined time. A decision is made whether a total number of interrupts raised in the predetermined period differs from the allowable number. The count number of the counter is adjusted to cause the difference between the total number of interrupts in the predetermined period and the allowable number to decrease.

36 Claims, 4 Drawing Sheets

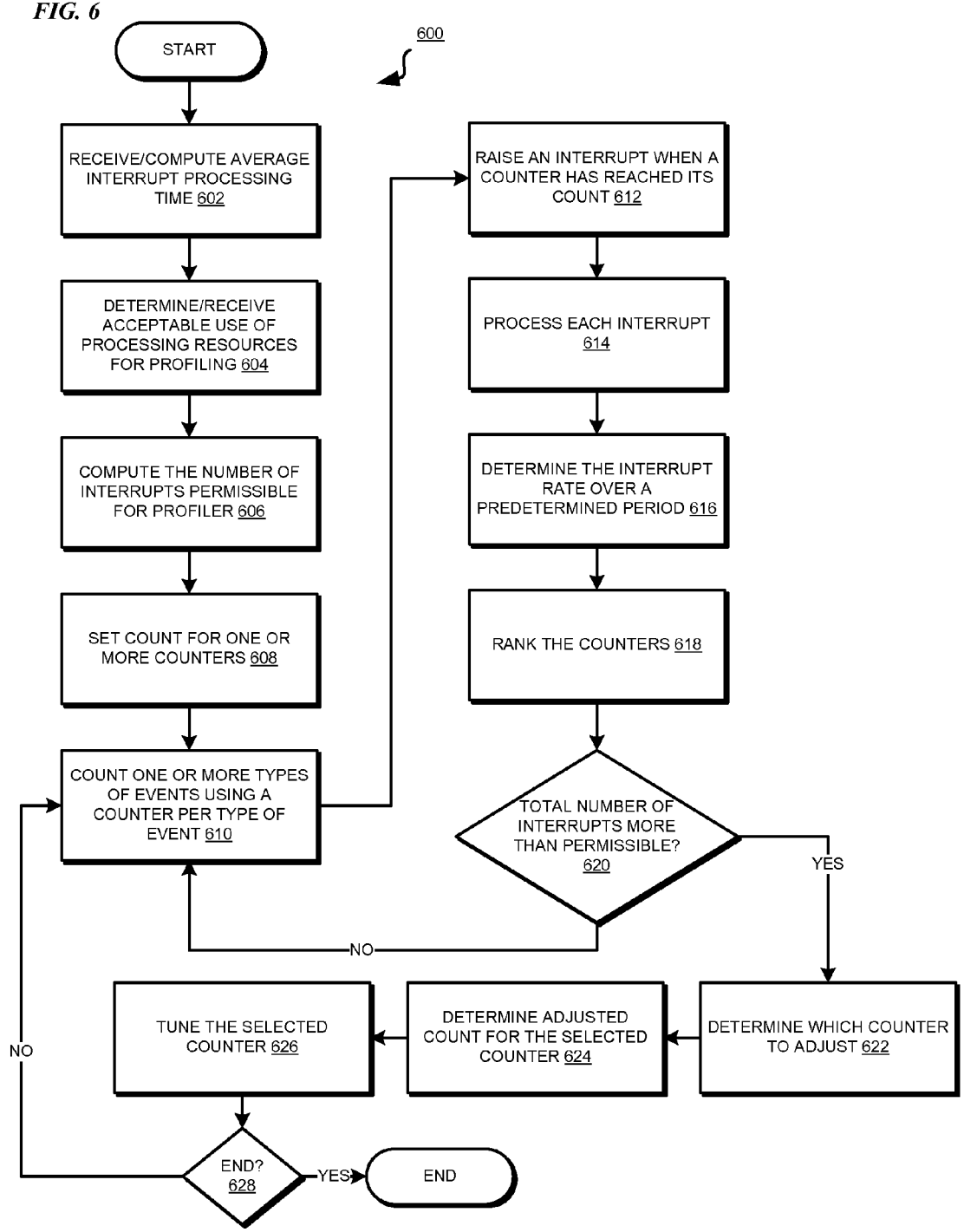

SMART PROFILER

BACKGROUND OF THE INVENTION

1. Field of the Invention

The present invention relates generally to an improved data processing system, and in particular, to a computer implemented method for profiling an application's computing resource usage in a data processing system. Still more particularly, the present invention relates to a computer implemented method, system, and computer usable program code for a smart profiler that is capable of tuning its own intrusion into the data processing system's operation.

2. Description of the Related Art

As software applications execute in a data processing system, they consume computing resources. For example, a software application uses processor cycles to perform computations, input/output (I/O), and other manipulation of data. Users often have to measure the performance of a software application as pertains to the software application's usage of the computing resources.

Such measurements are useful in learning if a certain portion of the application is performing inefficiently. For example, a function call in a software application may result in consuming a disproportionate amount of processor time. Users can modify or alter the application based on such measurements so that the application performs more efficiently than before.

Users use a software tool called a profiler for performing these measurements. A profiler is a software application that can monitor and report on another application's usage of computing resources.

Different types of profilers measure the performance of applications in different ways. For example, an interrupt based profiler relies on interrupts to capture representative activities of the data processing system under test. In other words, these profilers capture the interrupts generated by the data processing system and analyze those interrupts to perform the measurements.

Typically, a user using an interrupt based profiler can trigger the interrupts in one of two ways. First, the user can trigger interrupts based on a predetermined time interval using a timer. Users now disfavor this method of triggering interrupts over the alternative.

Alternatively, the user can use event based profiling. Event based profiling uses specific events to trigger interrupts as opposed to the passage of a fixed amount of time. Event based interrupts generally yield broader profiling results as compared to timer based interrupts. The events, including cycle events, may be caused by the application that may be executing and therefore an interrupt based on those events may provide information related to the application.

Event based profiling uses the performance monitor units (PMU) included in most modern processors that can trigger interrupts to measure various hardware level events. Some examples of these events are processor cycles elapsed, instructions retired, translation lookaside buffer misses, level 2 cache misses, level 3 cache misses, remote memory accesses, and disk I/O.

SUMMARY OF THE INVENTION

The illustrative embodiments provide a method, system, and computer usable program product for a smart profiler. An allowable number of interrupts for use by a profiler application is determined. A count number for a counter is determined. The counter is configured to count occurrences of an event in a data processing system up to the count number. An interrupt is raised when the counter has counted the occurrences of the event up to the count number. The interrupt is processed. The counting of occurrences of the event, raising the interrupt, and processing the interrupt are repeated for a predetermined time. A decision is made whether a total number of interrupts raised in the predetermined period differs from the allowable number. The count number of the counter is adjusted to cause the difference between the total number of interrupts in the predetermined period and the allowable number to decrease.

In an embodiment, the allowable number of interrupts may be a total of a single type interrupt, several types of interrupts, or a combination thereof, allowable in the predetermined period.

In an embodiment, a set of counters may be used, each counter in the set of counters being used to count an event from a set of events. A count number may be set for each counter in the set of counters. A subset of counters may be identified for adjustment. The count number of the subset of counters may be adjusted to cause the difference between the total number of interrupts in the predetermined period and the allowable number to decrease.

In an embodiment, the adjusting may include adjusting a first counter in the subset of counters to a first new count number, the first new count number being different from a second new count number used for adjusting a second counter in the subset of counters. A second subset of counters in the set of counters may not be adjusted.

In an embodiment, each event in the set of events may correspond to an interrupt in a set of interrupts. The total number of interrupts may include all occurrences of all interrupts in the set of interrupts over the predetermined period.

In an embodiment, the total number of interrupts raised in the predetermined period may differ from the allowable number by the total number exceeding the allowable number, or the allowable number exceeding the total number. The count number of the counter may be increased responsive to the total number exceeding the allowable number or decreased responsive to the allowable number exceeding the total number.

In an embodiment, the configuring, the raising, the processing, the repeating, the deciding, and the adjusting may be reiterated. The reiterating may be terminated when the difference between the total number of interrupts in the predetermined period and the allowable number is within a tolerance value.

In an embodiment, in determining the allowable number of interrupts for use by the profiler application, an average time to process the interrupt may be identified. An input may be received with information about permissible usage of the data processing system for profiling tasks. The allowable number of interrupts may be computed from the average time and the permissible usage.

In an embodiment, the counter may be a component of the performance monitor units of a processor coupled to the data processing system, or a counter associated with an application.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 6 depicts a flowchart of a process of tuning a profiler in accordance with an illustrative embodiment.

DETAILED DESCRIPTION OF THE PREFERRED EMBODIMENT

Figure 1:
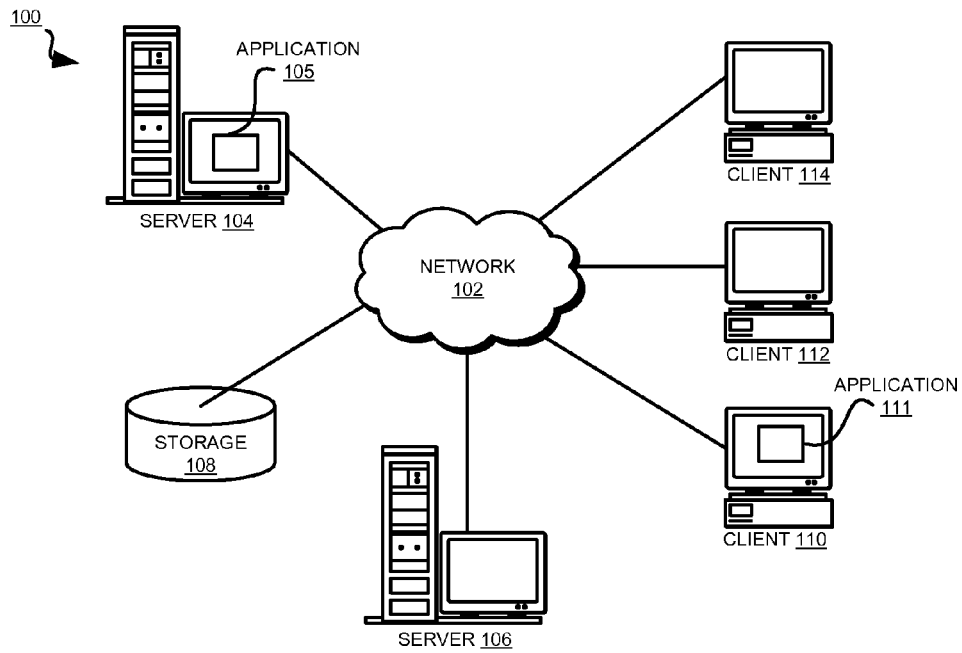
FIG. 1 depicts a pictorial representation of a network of data processing systems in which illustrative embodiments may be implemented.

According to the illustrative embodiments, event based profiling uses a sampling of the events of interest during the execution of the application being tested. For example, a user may configure an event based profiler to take a sample for every hundred thousand events of a particular type of event. Taking a sample is raising an interrupt at, before, or after the elapse of a preset number of those events.

As an example, in the above example user configuration, the user may raise a specific interrupt every hundred thousandth level 2 cache miss event. Typically, the PMU in the processor increments the event count for an event as the specific event occurs and raises the interrupt when the preset number of that event has occurred.

The illustrative embodiments recognize that events such as level 2 cache miss events may occur in a non-deterministic manner during the execution of the measured application. The more an application's execution causes level 2 cache miss events to occur in the example above, the faster the PMU will raise the interrupt upon the elapse of the preset number of that event.

As another example, the user may configure an event based profiler to raise a different type of interrupt at the elapse of every ten thousand processor cycles. The PMU would count off the processor cycles and raise an interrupt at the elapse of the preset number of processor cycles. The illustrative embodiments recognize that if a processor is operating at 4.7 Giga Hertz (GHz), the PMU will raise four hundred and seventy thousand interrupts per second under this example configuration.

The illustrative embodiments recognize that the event based profiler may not yield reliable performance measurements of the execution of the application being tested. As described with respect to the example above, the event based interrupts, under certain circumstances, can themselves overburden the system. The over-burdening may be to the extent that the overall performance of the data processing system deteriorates such that it is difficult to distinguish the performance deterioration due to the tested application and that due to the profiler.

Thus, the illustrative embodiments recognize that configuring event based interrupts in certain configurations can cause excessive interrupt handling overhead in the data processing system. The illustrative embodiments recognize that setting a sampling rate of events too low can result in a large number of interrupts. A sampling rate is a number of events at the elapse of which the PMU is configured to raise an interrupt. A sampling rate is high if it causes the PMU to raise a number of interrupts that exceeds a threshold number of interrupts. A sampling rate is low if it causes the PMU to raise a number of interrupts that falls short of a threshold number of interrupts.

Thus, the illustrative embodiments recognize that the profiler's activities can themselves result in a loss of statistical validity of the events caused by the tested application if the sampling rate is set high. The illustrative embodiments further recognize that setting a sampling rate of an event low can also cause the statistical validity of the sampling to be invalid. In case of a sampling rate being low, the interrupts may be so far apart in time that the application may finish executing before an interrupt is available to the profiler.

The illustrative embodiments recognize that a suitable sampling rate may lie between the high and the low sampling rates. Furthermore, the illustrative embodiments recognize that the suitable sampling rate may vary over a variety of factors. For example, what is a suitable sampling rate for one event for one tested application may not be suitable for the same event for another tested application. As another example, what may be a suitable sampling rate for one event may not be suitable for another event.

As another example, what may be a suitable sampling rate for one event for one application at one time may not be suitable at another time of execution of the same application. As another example, what may be a suitable sampling rate for one event for one application on one data processing system may not be suitable for execution of the same application on another data processing system.

The illustrative embodiments specifically recognize the above problems related to the sampling rates of events only as examples. The illustrative embodiments recognize that many other factors may similarly affect the selection of a suitable sampling rate. Any factor affecting the selection of a suitable sampling rate is within the contemplation of the illustrative embodiments.

To address these and other problems related to profiling applications, the illustrative embodiments provide a method, system, and computer usable program product for a smart profiler. The illustrative embodiments describe ways in which a profiler incorporating the illustrative embodiments may self-adjust, or tune, the sampling rates of one or more events during the testing of an application. Tuning is the process of adjusting or self-adjusting the sampling rate. Self-adjusting a parameter of a profiler is the process of adjusting the parameter of the profiler without user intervention.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing environments only as an example for the clarity of the description. The illustrative embodiments may be used in conjunction with other comparable or similarly purposed architectures for using virtualized real memory and managing virtual machines.

Figure 2:
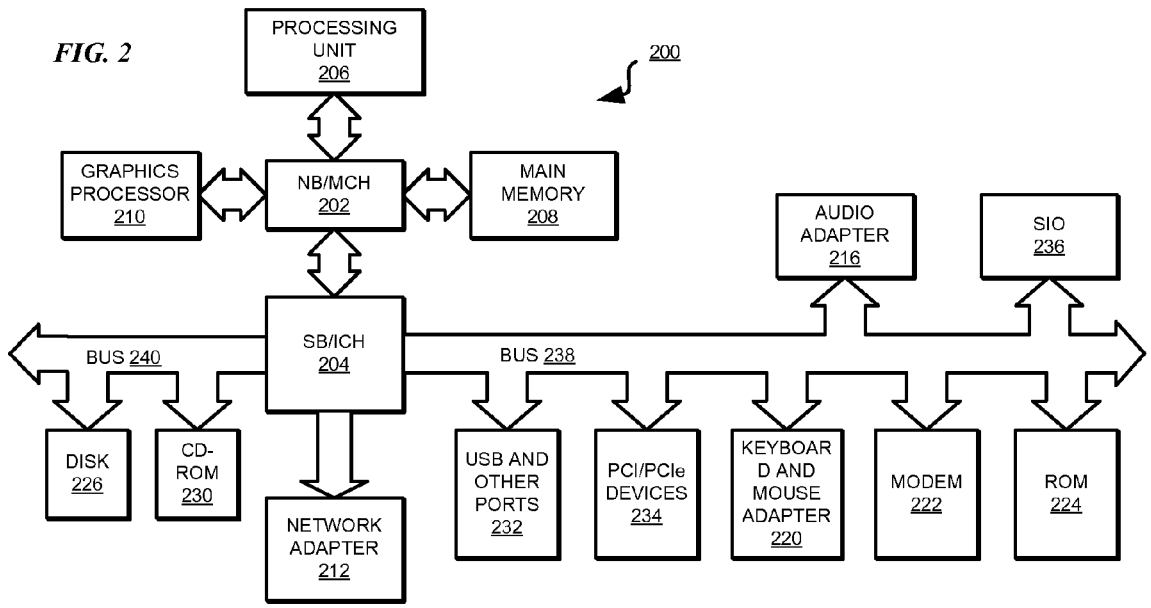
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108.

Software applications may execute on any computer in data processing environment 100. In the depicted example, server 104 includes application 105, which may be one or more software applications, hardware components, firmware, or any combination thereof, that may be tested or measured. Client 110 may include application 111, which may be a profiler application. Application 111 may measure the performance of application 105. Application 111 may include the illustrative embodiments.

Tested application 105 and profiler application 111 may be executed on any data processing system or any combination of client and server data processing systems in data processing environment 100 without departing from the scope of the illustrative embodiments. In one embodiment, tested application 105 may execute on client 112 and profiler application 111 may execute on server 104 or client 114. In another embodiment, tested application 105 and profiler application 111 may execute on a common data processing system, such as client 110 or server 104.

In addition, clients 110, 112, and 114 couple to network 102. Servers 104 and 106, storage units 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
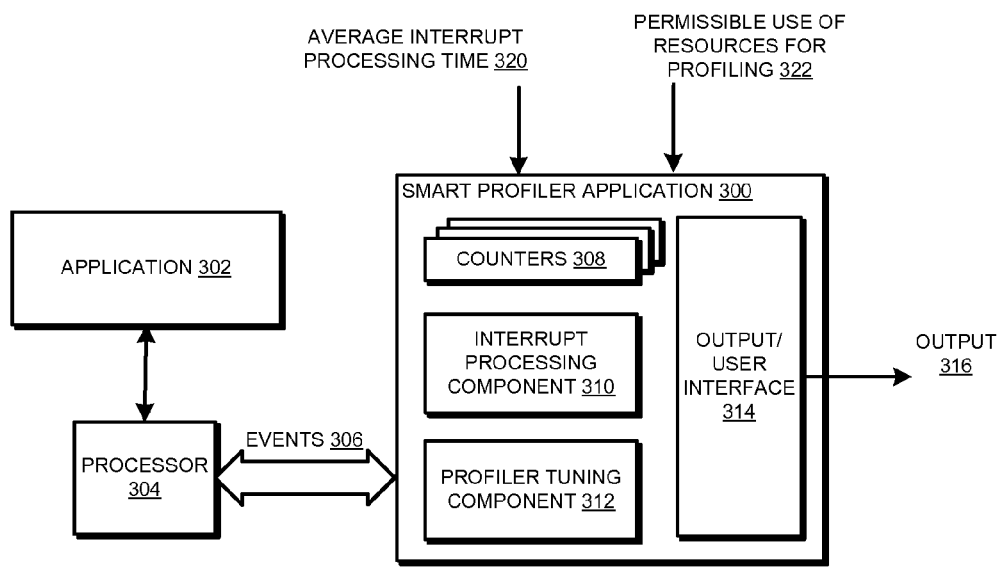
FIG. 3 depicts a block diagram of a smart profiler in accordance with an illustrative embodiment.

With reference to FIG. 3, this figure depicts a block diagram of a smart profiler in accordance with an illustrative embodiment. Smart profiler 300 is a profiler application, such as application 111 in FIG. 1, which includes an illustrative embodiment described herein.

Smart profiler 300 may be used to measure the performance or resource usage of application 302, which may be tested application 105 in FIG. 1. Processor 304 may process the code of application 302 and generate events 306.

Counters 308 is a set of counters used by smart profiler 300. A set of counters is one or more counters. A counter in counters 308 may be used to count a specific event according to a set sampling rate. Collectively, several counters in counters 308 may count off several events, possibly at same or different sampling rates, during the profiling process.

In one embodiment, counters 308 may be associated with processor 304, such as in a PMU of processor 304. In another embodiment, counters 308 may be associated with a separate application or data processing system. This figure depicts counters 308 as associated with smart profiler 300 only as a logical view as an example embodiment. Such a depiction is not intended to be a limitation on the illustrative embodiments.

Interrupt processing component 310 processes each interrupt as the interrupt is raised according to event based interrupt process described above. Profiler tuning component 312 is a component that performs the tuning of the counters during the profiling process. In other words, profiler tuning component 312 adjusts the sampling rates of one or more counters without user intervention in accordance with the illustrative embodiments.

User interface or output component 314 may be a component that presents the profiling results to a user. Output 316 may be such profiling results. Furthermore, component 314 may allow a user to configure smart profiler 300 as a specific implementation may need. For example, in one embodiment, component 316 may allow a user to set an initial sampling rate for counters 308. An initial sampling rate is a sampling rate set as an initial count up to which a counter should count. Profiler tuning component 312 may subsequently tune the initial sampling rate.

Sampling rate is the inverse of count. For example, if the counter were to count to ten thousand, the count would be ten thousand, but the sampling rate would be once every ten thousand. Therefore, setting or adjusting a count automatically sets or adjusts the sampling rate, and vice versa. Consequently, stating that a count is set implies that a sampling rate is set, and vice versa.

Smart profiler 300 may receive an input or compute a value for average interrupt processing time 320. Smart profiler 300 may also receive an input or compute a value for permissible use of resources for profiling 322.

Figure 4:
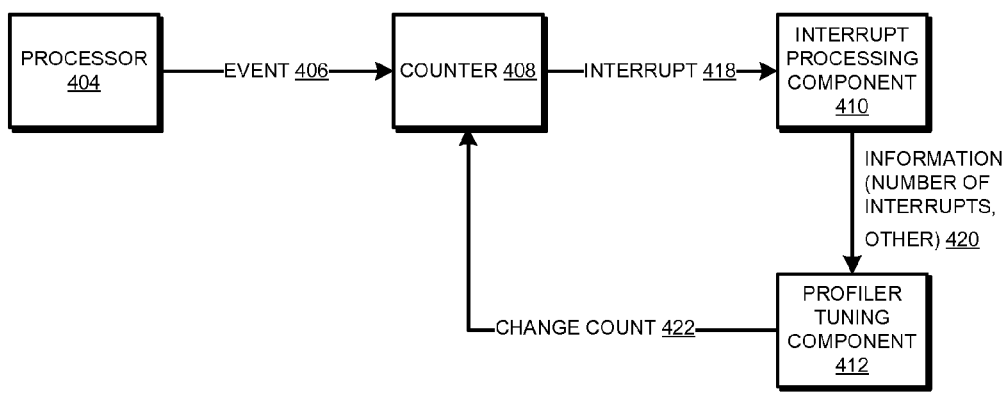
FIG. 4 depicts a block diagram of a smart profiler in operation in accordance with an illustrative embodiment.

With reference to FIG. 4, this figure depicts a block diagram of a smart profiler in operation in accordance with an illustrative embodiment. Processor 404 may correspond to processor 304 in FIG. 3. Counter 408 may be a counter in counters 308 in FIG. 3. Interrupt processing component 410 and profiler tuning component 412 may correspond to like components 310 and 312 in FIG. 3 respectively.

Processor 404 may generate one or more events of a particular type of event 406. Counter 408 may count occurrences of event 406 based on a sampling rate, either initially set or previously adjusted. Interrupt processing component 410 processes one or more occurrences of interrupt 418 resulting from counter 408 reaching the count. An initial value for sampling rate may be determined by computation using factors such as average interrupt processing time 320 and permissible use of resources for profiling 322 in FIG. 3.

Interrupt processing component 410 may provide information 420 to profiler tuning component 412. In one embodiment, information 420 may include a total number of interrupts raised in a present time interval, such as one second. Information 420 may also include additional other implementation dependent information.

Profiler tuning component 412 may use information 420 to determine if the sampling rate of counter 408 should be changed. For example, profiler tuning component 412 may determine that the total number of interrupts raised in the past one second, as provided in information 420, exceeds a threshold number of interrupts permissible for profiler use. A threshold number of interrupts, cumulatively or by specific types, may be determined on an implementation by implementation basis to maintain an agreed statistical validity of the measurements performed by the smart profiler.

If profiler tuning component 412 determines that the sampling rate of counter 408 has to change, profiler tuning component 412 sends change count instruction 422 to counter 408. Making the determination and changing the count is the process of tuning according to the illustrative embodiments.

In one embodiment, profiler tuning component 412 may change the count, which is the inverse of sampling rate, for counter 408. In another embodiment, profiler tuning component 412 may change the sampling rate. In another embodiment, another component may receive change count instruction 422 or a corresponding change sampling rate instruction, and effect the change. An implementation may adjust or tune the count of counter 408 in other ways based on making the determination without departing the scope of the illustrative embodiments.

Thus, based on a determination that the number of interrupts exceeded or fell short of a threshold number of interrupts, a profiler tuning component of a smart profiler according to the illustrative embodiments may adjust the sampling rates of one or more counters. In a next iteration, for example, over the next one second, the counter may count off events based on the adjusted sampling rate. The profiler tuning component may receive information about a number of interrupts in that second. The profiler tuning component may make another determination about adjusting the sampling rate in a similar manner. The profiler tuning component may increase the sampling rate to increase the number of interrupts, or decrease the sampling rate to decrease the number of interrupts as a part of the tuning process.

This process of receiving information, such as information 420, making a determination, and adjusting the sampling rate is a part of the tuning process according to an illustrative embodiment. The process is described in detail with respect to FIG. 6, infra.

Figure 5:
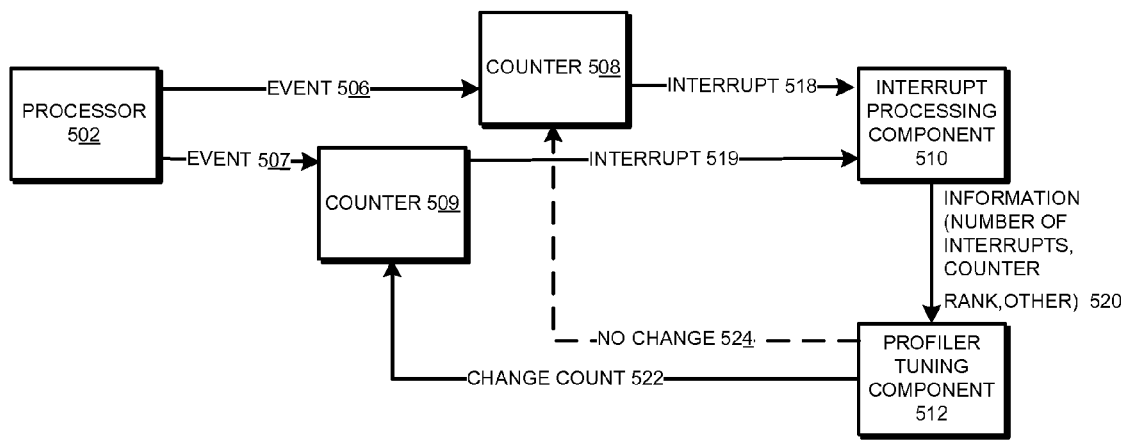
FIG. 5 depicts a block diagram of a smart profiler in operation in accordance with an illustrative embodiment.

With reference to FIG. 5, this figure depicts a block diagram of a smart profiler in operation in accordance with an illustrative embodiment. Processor 504 may correspond to processor 304 or processor 404 in FIG. 3 or 4 respectively. Counters 508 and 509 may be separate counters in counters 308 in FIG. 3. Interrupt processing component 510 and profiler tuning component 512 may correspond to like components 310 and 312 in FIG. 3 or components 410 and 412 in FIG. 4 respectively. Furthermore, the descriptions, operations, functions, or actions, as described with respect to this figure include and further elaborate the corresponding descriptions, operations, functions, or actions as described with respect to FIG. 4.

Processor 504 may generate one or more events of a particular type of event 506 and one or more events of another type of event 507. Counter 508 may count occurrences of event 506 based on a sampling rate, either initially set or previously adjusted. Counter 509 may count occurrences of event 507 based on a sampling rate, either initially set or previously adjusted, and either same or different from sampling rate of counter 508. Interrupt processing component 510 processes one or more occurrences of interrupts 518 and 519 resulting from counters 508 and 509 reaching their respective count.

Interrupt processing component 510 may provide information 520 to profiler tuning component 512. In one embodiment, information 520 may include a total number of interrupts 518 and 519 raised in a present time interval, such as one second.

Information 520 may also include additional other implementation dependent information. For example, information 520 may include a ranking of counters 508 and 509. In one embodiment, the ranking may indicate which counter generated more interrupts than the other remaining counters. In another embodiment, the ranking may indicate which counter was associated with an interrupt that most exceeded that interrupts threshold number, in an ascending or descending order.

For example, information 520 may include the following example information—counter 508, rank 2, total number of interrupt 518 seven thousand fifty six, over by fifty six; counter 509, rank 1, total number of interrupt 519 one hundred thousand and twenty, over by six hundred thousand and twenty. Thus, this example information 520 may indicate that occurrences of interrupt 518 from counter 509 have exceeded their threshold by a larger number as compared to the excess occurrences of interrupt 518 from counter 508.

Profiler tuning component 512 may use information 520 to determine if the sampling rate of counter 508, counter 509, both counters, or no counter, should be changed. Using the example information 520 described above, profiler tuning component 512 may determine that the total number of interrupts raised due to the sampling rate of counter 509 in the past one second, exceeds a threshold number of interrupts beyond any allowable tolerance value.

A tolerance value may be a value of a deviation from the threshold value where such deviation may not require tuning. Threshold numbers of interrupts and their tolerance values, cumulatively or by specific types, may be determined on an implementation by implementation basis to maintain an agreed statistical validity of the measurements performed by the smart profiler. For example, when a cumulative threshold number of interrupts across all types of interrupts is used in an implementation, profiler tuning component 512 may adjust more than one counter with or without regard to their ranking so as to bring the total number of interrupts across all counters within the threshold number and any tolerance value.

Continuing with the example information 520, profiler tuning component 512 may determine that the sampling rate of counter 509 has to change because the variance between the total number of interrupt 519 exceeds a threshold value beyond a tolerance value. Profiler tuning component 512 may also determine that the sampling rate of counter 508 need not change because the variance between the total number of interrupt 518 does not exceed a threshold value beyond a tolerance value for that interrupt.

Accordingly, profiler tuning component 512 may send change count instruction 522 to counter 509 and may leave the sampling rate or count of counter 508 unchanged. In one embodiment, profiler tuning component 512 may send a no change instruction 524 indicating the decision not to change the sampling rate to counter 508.

According to FIGS. 4 and 5, an illustrative embodiment may set any number of counters to measure any number of events as a particular processor may allow, without limitations. Furthermore, an illustrative embodiment may change the sampling rates of one, all, some, or none of the events using their corresponding counters. Additionally, for information 420 and 520 in FIGS. 4 and 5 respectively, an illustrative embodiment may provide the above described information, additional information, or different information to the profiler tuning component.

The profiler tuning component according to the illustrative embodiments may make a determination whether to change a sampling rate using such information. Additionally, the profiler tuning component may determine the amount of adjustment for a sampling rate using any algorithm. As an example, the profiler may double the number of events counted by counter 509 in FIG. 5 before counter 509 subsequently triggers interrupt 519.

As another example, an algorithm used in a particular implementation may enable the profiler tuning component to make a sliding scale adjustment to the sampling rates based on the deviation of the volume of interrupts from a threshold. Of course, the profiler tuning component may increment or decrement the count by any value as determined by the algorithm used.

With reference to FIG. 6, this figure depicts a flowchart of a process of tuning a profiler in accordance with an illustrative embodiment. Process 600 may be implemented in smart profiler 300 in FIG. 3.

Process 600 begins by receiving or computing an average interrupt processing time (step 602). Average interrupt processing time is the average time a profiler according to the illustrative embodiments in a given configuration takes to process an interrupt. The average may be computed using a particular interrupt, such as the most or least resource intensive interrupt, or over a combination of interrupts. A user may input the average time of step 602, or process 600 may compute the average time based on other values available to process 600.

Process 600 receives or determines an acceptable use of processing resources for profiling purposes (step 604). For example, a particular configuration may allow a profiler to use no more than five percent of the data processing system resources, including processor cycles to process interrupts. A user may input the allowable usage of step 604, or process 600 may compute the allowable usage based on other values available to process 600, such as a default usage percentage or value.

Based on the information of steps 602 and 604, process 600 computes the number of interrupts permissible for process 600 to process (step 606). For example, step 606 may lead to the threshold number of total interrupts as described with respect to FIGS. 4 and 5.

Process 600 may set the count for one or more counters that may count off one or more events and raise one or more interrupts (step 608). Process 600 may set the count of step 608 using the information from steps 602, 604, and 606. During certain execution of process 600, the count set in step 608 may be an initial count or an initial sampling rate. During certain other executions of process 600 or parts thereof, the count set in step 608 may be an adjusted count or an adjusted sampling rate.

Process 600 counts the occurrences of one or more types of events using one or more counters that are set in step 608, using one counter per type of event (step 610). Process 600 raises an interrupt when a counter reaches its count set in step 608 (step 612). Process 600 processes each interrupt raised in step 612 (step 614).

Process 600 determines an interrupt rate over a predetermined period (step 616). An interrupt rate is a total number of interrupts over a predetermined period, such as one second. Process 600 ranks the various counters (step 618). Specific implementations of process 600 may rank the counters based on any suitable criteria so long as the ranking enables a profiler tuning process to identify the counters that have to be tuned. For example, in one embodiment, process 600 may rank the counters by the total number of interrupts raised from the events those counters counted over the predetermined period.

Process 600 determines if the total number of interrupts exceeds the computed number of interrupts permissible for the profiler in step 606 (step 620). Note that step 620 may be implemented in at least two ways as follows. In one embodiment, step 620 may determine if the grand total of all interrupts exceeds a permissible grand total of all interrupts of all types. In another embodiment, step 620, step 606, and other relevant steps may be computed or determined for each type of interrupt.

Other ways of computing the steps of process 600 will be apparent from this disclosure. For example, the computations or determinations in the various steps may be made for a combination or subset of interrupts.

If process 600 determines that the number of interrupts does not exceed the computed number of interrupts permissible ("No" path of step 620), process 600 returns to step 610 and continues there from. If, however, process 600 determines that the number of interrupts exceeds the computed number of interrupts permissible for the profiler in step 606 ("Yes" path of step 620), process 600 determines which counter to adjust (step 622). Selection of one or more counters for adjusting their counts or sampling rates may be based on any suitable algorithm.

Process 600 also determines an adjusted count or adjusted sampling rate for each selected counter (step 624). The amount of adjustment may be computed using any algorithm or methodology. For example, in one embodiment, process 600 may increment or decrement a count by half the previous value of the count or half the previous increment or decrement of the count. Other methods for incrementing or decrementing the count or sampling rates may be used without departing from the scope of the illustrative embodiments.

Process 600 adjusts or tunes the selected one or more counters (step 626). Process 600 determines if process 600 should end (step 628). If process 600 determines to continue ("No" path of step 628), process 600 returns to step 610 and continues there from. If process 600 should end ("Yes" path of step 628), process 600 ends thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for a smart profiler. Using the illustrative embodiments, a profiler may be able to self adjust its own intrusiveness on the data processing system where the profiler may be executing.

The smart profiler starts with a total number of interrupts that may be acceptable for use by the profiler. The total number of interrupts may be total of all types of interrupts or only of some types of interrupts. The acceptable number may be computed, in one example way, by using an average type to process an interrupt and an acceptable usage of the computing resources by the profiler.

Having determined the number of interrupts permissible for the profiler's use under given circumstances of the data processing system, the smart profiler according to the illustrative embodiments sets initial sampling rates of the various events from which the interrupts are triggered. The smart profiler of the illustrative embodiments processes the interrupts raised during a predetermined period based on the counts of the various events.

The smart profiler of the illustrative embodiments determines if the sampling rate of one or more events should be adjusted. The smart profiler makes this determination based on whether one or more types of interrupts exceed the permissible number of interrupts.

The smart profiler of the illustrative embodiments adjusts the sampling rate up or down from the existing sampling rate to increase or decrease the number of interrupts. With one or more iterations of the adjustments, the smart profiler of the illustrative embodiments may achieve sampling rates for each event that may be desirable in a given configuration. In other words, the smart profiler may achieve sampling rates for the various events such that the profiler's resource usage does not distort measurements of the tested application's performance. In this manner, the illustrative embodiments maintain the statistical validity of the measurements and avoid overburdening of the data processing system by the profiler.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for a smart profiler, the computer implemented method comprising:

determining an allowable number of interrupts for use by a profiler application, the profiler application executing in a data processing system;

determining a count number for a counter;

configuring the counter to count occurrences of an event in the data processing system up to the count number;

raising an interrupt when the counter has counted the occurrences of the event up to the count number;

processing the interrupt;

repeating for a predetermined time, the counting of occurrences of the event, raising the interrupt, and processing the interrupt;

deciding whether a total number of interrupts raised in the predetermined period differs from the allowable number of interrupts; and adjusting the count number of the counter to cause the difference between the total number of interrupts in the predetermined period and the allowable number of interrupts to decrease, wherein the allowable number of interrupts is not adjusted.

2. The computer implemented method of claim 1, further comprising:

using a set of counters, each counter in the set of counters being used to count an event from a set of events;

setting a count number for each counter in the set of counters;

identifying a subset of counters for adjustment; and adjusting the count number of the subset of counters to cause the difference between the total number of interrupts in the predetermined period and the allowable number of interrupts to decrease.

3. The computer implemented method of claim 2, wherein each counter in the subset of counters is ranked based on the number of interrupts determined by each counter and the adjusting includes adjusting a first counter in the subset of counters to a first new count number, the first new count number being different from a second new count number used for adjusting a second counter in the subset of counters, and wherein a second subset of counters in the set of counters is not adjusted.

4. The computer implemented method of claim 2, wherein each event in the set of events corresponds to an interrupt in a set of interrupts, and wherein the total number of interrupts comprises all occurrences of all interrupts in the set of interrupts over the predetermined period.

5. The computer implemented method of claim 2, further comprising:

ranking each counter in the set of counters based on the number of interrupts determined by each counter.

6. The computer implemented method of claim 1, wherein the total number of interrupts raised in the predetermined period differs from the allowable number of interrupts by one of (i) the total number exceeding the allowable number of interrupts, and (ii) the allowable number of interrupts exceeding the total number, and wherein the count number of the counter is one of (i) increased responsive to the total number exceeding the allowable number of interrupts, and (ii) decreased responsive to the allowable number of interrupts exceeding the total number.

7. The computer implemented method of claim 1, further comprising:
   reiterating the configuring, the raising, the processing, the repeating, the deciding, and the adjusting; and
   terminating the reiterating when the difference between the total number of interrupts in the predetermined period and the allowable number of interrupts is within a tolerance value.

8. The computer implemented method of claim 1, wherein determining the allowable number of interrupts for use by the profiler application further comprises:
   identifying an average time to process the interrupt;
   receiving an input for permissible usage of the data processing system for profiling tasks; and
   computing the allowable number of interrupts from the average time and the permissible usage.

9. The computer implemented method of claim 1, wherein the counter is one of (i) a component of the performance monitor units of a processor coupled to the data processing system, and (ii) a counter associated with an application.

10. A computer usable program product comprising a computer usable storage medium including computer usable code for a smart profiler, the computer usable code comprising:
    computer usable code for determining an allowable number of interrupts for use by a profiler application;
    computer usable code for determining a count number for a counter;
    computer usable code for configuring the counter to count occurrences of an event in a data processing system up to the count number;
    computer usable code for raising an interrupt when the counter has counted the occurrences of the event up to the count number;
    computer usable code for processing the interrupt;
    computer usable code for repeating for a predetermined time, the counting of occurrences of the event, raising the interrupt, and processing the interrupt;
    computer usable code for deciding whether a total number of interrupts raised in the predetermined period differs from the allowable number of interrupts; and
    computer usable code for adjusting the count number of the counter to cause the difference between the total number of interrupts in the predetermined period and the allowable number of interrupts to decrease, wherein the allowable number of interrupts is not adjusted.

11. The computer usable program product of claim 10, further comprising:
    computer usable code for using a set of counters, each counter in the set of counters being used to count an event from a set of events;
    computer usable code for setting a count number for each counter in the set of counters;
    computer usable code for identifying a subset of counters for adjustment; and
    computer usable code for adjusting the count number of the subset of counters to cause the difference between the total number of interrupts in the predetermined period and the allowable number of interrupts to decrease.

12. The computer usable program product of claim 11, wherein the computer usable code for adjusting includes computer usable code for adjusting a first counter in the subset of counters to a first new count number, the first new count number being different from a second new count number used for adjusting a second counter in the subset of counters, and wherein the computer usable code for adjusting causes a second subset of counters in the set of counters to not be adjusted.

13. The computer usable program product of claim 11, wherein each event in the set of events corresponds to an interrupt in a set of interrupts, and wherein the total number of interrupts comprises all occurrences of all interrupts in the set of interrupts over the predetermined period.

14. The computer usable program product of claim 11, further comprising:
    computer usable code for ranking each counter in the set of counters based on the number of interrupts determined by each counter.

15. The computer usable program product of claim 10, wherein the total number of interrupts raised in the predetermined period differs from the allowable number of interrupts by one of (i) the total number exceeding the allowable number of interrupts, and (ii) the allowable number of interrupts exceeding the total number, and wherein the count number of the counter is one of (i) increased responsive to the total number exceeding the allowable number of interrupts, and (ii) decreased responsive to the allowable number of interrupts exceeding the total number.

16. The computer usable program product of claim 10, further comprising:
    computer usable code for reiterating the configuring, the raising, the processing, the repeating, the deciding, and the adjusting; and
    computer usable code for terminating the reiterating when the difference between the total number of interrupts in the predetermined period and the allowable number of interrupts is within a tolerance value.

17. The computer usable program product of claim 10, wherein the computer usable code for determining the allowable number of interrupts for use by the profiler application further comprises:
    computer usable code for identifying an average time to process the interrupt;
    computer usable code for receiving an input for permissible usage of the data processing system for profiling tasks; and
    computer usable code for computing the allowable number of interrupts from the average time and the permissible usage.

18. The computer usable program product of claim 10, wherein the counter is one of (i) a component of the performance monitor units of a processor coupled to the data processing system, and (ii) a counter associated with an application.

19. A data processing system for a smart profiler, the data processing system comprising:
    a storage device including a storage medium, wherein the storage device stores computer usable program code; and
    a processor, wherein the processor executes the computer usable program code, and wherein the computer usable program code comprises:
       computer usable code for determining an allowable number of interrupts for use by a profiler application;
       computer usable code for determining a count number for a counter;
       computer usable code for configuring the counter to count occurrences of an event in a data processing system up to the count number;
       computer usable code for raising an interrupt when the counter has counted the occurrences of the event up to the count number;
       computer usable code for processing the interrupt;

computer usable code for repeating for a predetermined time, the counting of occurrences of the event, raising the interrupt, and processing the interrupt;

computer usable code for deciding whether a total number of interrupts raised in the predetermined period differs from the allowable number of interrupts; and computer usable code for adjusting the count number of the counter to cause the difference between the total number of interrupts in the predetermined period and the allowable number of interrupts to decrease, wherein the allowable number of interrupts is not adjusted.

20. The data processing system of claim 19, further comprising:

computer usable code for using a set of counters, each counter in the set of counters being used to count an event from a set of events;

computer usable code for setting a count number for each counter in the set of counters;

computer usable code for identifying a subset of counters for adjustment; and computer usable code for adjusting the count number of the subset of counters to cause the difference between the total number of interrupts in the predetermined period and the allowable number of interrupts to decrease.

21. The data processing system of claim 20, wherein the computer usable code for adjusting includes computer usable code for adjusting a first counter in the subset of counters to a first new count number, the first new count number being different from a second new count number used for adjusting a second counter in the subset of counters, and wherein the computer usable code for adjusting causes a second subset of counters in the set of counters to not be adjusted.

22. The data processing system of claim 20, wherein each event in the set of events corresponds to an interrupt in a set of interrupts, and wherein the total number of interrupts comprises all occurrences of all interrupts in the set of interrupts over the predetermined period.

23. The data processing system of claim 20, further comprising:

computer usable code for ranking each counter in the set of counters based on the number of interrupts determined by each counter.

24. The data processing system of claim 19, wherein the total number of interrupts raised in the predetermined period differs from the allowable number of interrupts by one of (i) the total number exceeding the allowable number of interrupts, and (ii) the allowable number of interrupts exceeding the total number, and wherein the count number of the counter is one of (i) increased responsive to the total number exceeding the allowable number of interrupts, and (ii) decreased responsive to the allowable number of interrupts exceeding the total number.

25. The data processing system of claim 19, further comprising:

computer usable code for reiterating the configuring, the raising, the processing, the repeating, the deciding, and the adjusting; and computer usable code for terminating the reiterating when the difference between the total number of interrupts in the predetermined period and the allowable number of interrupts is within a tolerance value.

26. The data processing system of claim 19, wherein the computer usable code for determining the allowable number of interrupts for use by the profiler application further comprises:

computer usable code for identifying an average time to process the interrupt;

computer usable code for receiving an input for permissible usage of the data processing system for profiling tasks; and computer usable code for computing the allowable number of interrupts from the average time and the permissible usage.

27. The data processing system of claim 19, wherein the counter is one of (i) a component of the performance monitor units of a processor coupled to the data processing system, and (ii) a counter associated with an application.

28. A system for a smart profiler, the system comprising:

means for determining an allowable number of interrupts for use by a profiler application, the profiler application executing in a data processing system;

means for determining a count number for a counter;

means for configuring the counter to count occurrences of an event in the data processing system up to the count number;

means for raising an interrupt when the counter has counted the occurrences of the event up to the count number;

means for processing the interrupt;

means for repeating for a predetermined time, the counting of occurrences of the event, raising the interrupt, and processing the interrupt;

means for deciding whether a total number of interrupts raised in the predetermined period differs from the allowable number of interrupts; and means for adjusting the count number of the counter to cause the difference between the total number of interrupts in the predetermined period and the allowable number of interrupts to decrease, wherein the allowable number of interrupts is not adjusted.

29. The system of claim 28, further comprising:

means for using a set of counters, each counter in the set of counters being used to count an event from a set of events;

means for setting a count number for each counter in the set of counters;

means for identifying a subset of counters for adjustment; and means for adjusting the count number of the subset of counters to cause the difference between the total number of interrupts in the predetermined period and the allowable number of interrupts to decrease.

30. The system of claim 29, wherein the means for adjusting includes means for adjusting a first counter in the subset of counters to a first new count number, the first new count number being different from a second new count number used for adjusting a second counter in the subset of counters, and wherein the means for adjusting causes a second subset of counters in the set of counters to not be adjusted.

31. The system of claim 29, wherein each event in the set of events corresponds to an interrupt in a set of interrupts, and wherein the total number of interrupts comprises all occurrences of all interrupts in the set of interrupts over the predetermined period.

32. The system of claim 29, further comprising:

means for ranking each counter in the set of counters based on the number of interrupts determined by each counter.

33. The system of claim 28, wherein the total number of interrupts raised in the predetermined period differs from the allowable number of interrupts by one of (i) the total number exceeding the allowable number of interrupts, and (ii) the allowable number of interrupts exceeding the total number, and wherein the count number of the counter is one of (i) increased responsive to the total number exceeding the allowable number of interrupts, and (ii) decreased responsive to the allowable number of interrupts exceeding the total number.

34. The system of claim 28, further comprising:
means for reiterating the configuring, the raising, the processing, the repeating, the deciding, and the adjusting; and
means for terminating the reiterating when the difference between the total number of interrupts in the predetermined period and the allowable number of interrupts is within a tolerance value.

35. The system of claim 28, wherein the means for determining the allowable number of interrupts for use by the profiler application further comprises:

means for identifying an average time to process the interrupt;

means for receiving an input for permissible usage of the data processing system for profiling tasks; and means for computing the allowable number of interrupts from the average time and the permissible usage.

36. The system of claim 28, wherein the counter is one of (i) a component of the performance monitor units of a processor coupled to the data processing system, and (ii) a counter associated with an application.

* * * * *